(12) United States Patent
Kondo

(10) Patent No.: US 7,197,653 B2
(45) Date of Patent: Mar. 27, 2007

(54) MICROCONTROLLER FOR FETCHING AND DECODING A FREQUENCY CONTROL SIGNAL TOGETHER WITH AN OPERATION CODE

(75) Inventor: Shuji Kondo, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 426 days.

(21) Appl. No.: 10/804,143

(22) Filed: Mar. 19, 2004

(65) Prior Publication Data

US 2004/0193930 A1 Sep. 30, 2004

(30) Foreign Application Priority Data

Mar. 31, 2003 (JP) ............................. 2003-094686

(51) Int. Cl.
*G06F 1/00* (2006.01)
*G06F 9/30* (2006.01)

(52) U.S. Cl. .................... 713/322; 713/300; 713/501; 713/600; 712/213

(58) Field of Classification Search ............... 713/300, 713/320, 500, 501, 600, 322; 712/213
See application file for complete search history.

(56) References Cited

U.S. PATENT DOCUMENTS 5,825,674 A * 10/1998 Jackson ...................... 713/321
5,940,602 A * 8/1999 Narayan et al. ............ 712/213
6,073,244 A 6/2000 Iwazaki
6,625,740 B1 * 9/2003 Datar et al. ................. 713/324
6,941,485 B2 * 9/2005 Nomura et al. ............. 713/501
2002/0108064 A1 * 8/2002 Nunally ...................... 713/300

FOREIGN PATENT DOCUMENTS

| JP | 52109841 | 9/1977 |
|----|----------|--------|
| JP | 62249233 | 10/1987 |
| JP | 01293440 | 11/1989 |
| JP | 02118811 | 5/1990 |
| JP | 10091430 | 4/1998 |

OTHER PUBLICATIONS

Hennessy et al., Computer Orginazation and Design: The Hardware/Software Interface, 1998, Morgan Kaufmann Publishers Inc., Second Ed., pp. 436-438.*
Japanese Office Action dated Aug. 23, 2006 with English translation.

* cited by examiner

*Primary Examiner*—Thomas Lee
(74) *Attorney, Agent, or Firm*—Stevens, Davis, Miller & Mosher, LLP

(57) ABSTRACT

A microcontroller is realized that is capable of eliminating the time lag required for changing the frequency during operation and of reducing power consumption by accurately and rapidly performing the frequency control in accordance with the task. Since frequency control can be performed in the pipeline processing of the execution instruction by adding a frequency control signal for determining the division ratio of the system clock to the operation code and fetching and decoding the frequency control signal together with the operation code by the pipeline processing, the time lag required for changing the frequency can be eliminated.

5 Claims, 12 Drawing Sheets

FIG. 3A
Instruction format
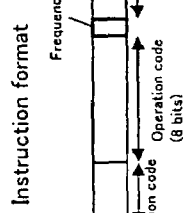
FIG. 3B
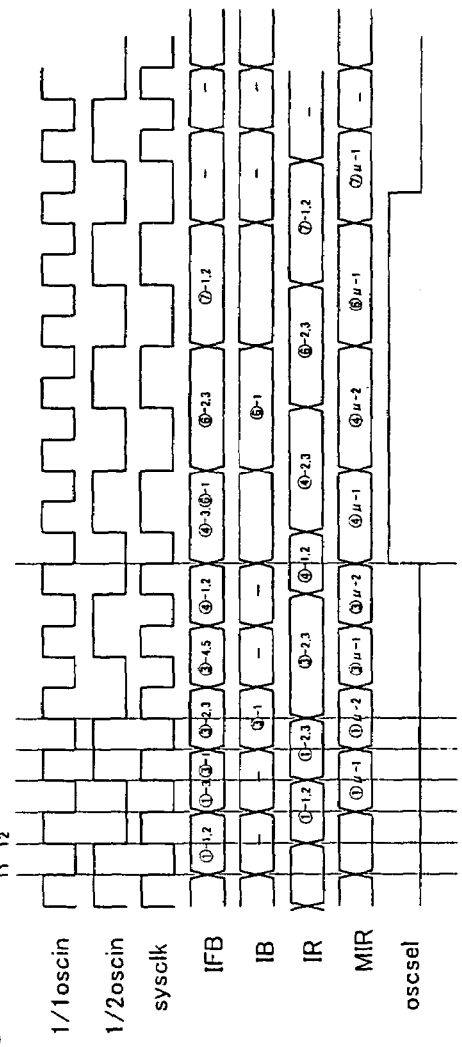
FIG. 3C

Instruction map B (corresponding to oscillation clock cycle divided by two)

Instruction map A (corresponding to oscillation clock cycle)

FIG. 6A

Instruction format

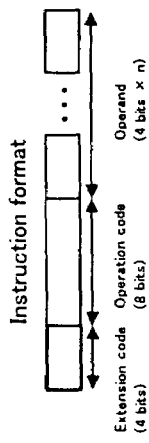

Extension code (4 bits) | Operation code (8 bits) | Operand (4 bits × n)

FIG. 6B

| Instruction | Machine code (in nibbles) 1 2 3 4 5 | | | | |
|---|---|---|---|---|---|
| ① ADD D0,D1 | (0011)0011 0001 | | | 3-nibble 2-cycle instruction | *D0,D1:Data register | (0011) Extension code for oscillation clock cycle | Set sysclk to oscillation clock cycle of oscin |
| ③ SUB imm8,D1 | (0101)1010 0101 <#8....> | | | 5-nibble 2-cycle instruction | | (0101) Extension code for oscillation clock cycle divided by two | |
| ④ SUB D0,D3 | (0101)1010 0011 | | | 3-nibble 2-cycle instruction | *D3:Data register | (0101) Extension code for oscillation clock cycle divided by two | |
| ⑥ ADD D2,D3 | (0011)0011 0001 | | | 3-nibble 1-cycle instruction | *D2:Data register | (0011) Extension code for oscillation clock cycle | |
| ⑦ AND D2,D3 | (0011)0111 1011 | | | 3-nibble 2-cycle instruction | | (0011) Extension code for oscillation clock cycle | Set sysclk to oscillation clock cycle divided by two of oscin |

FIG. 6C

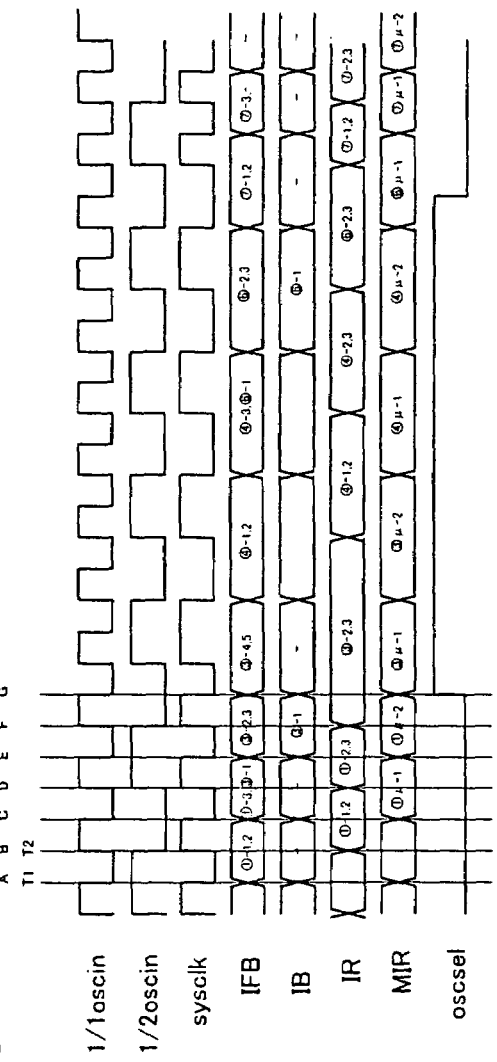

*0: Frequency control signal for setting sysclk to oscillation clock cycle of oscin
*1: Frequency control signal for setting sysclk to oscillation clock cycle divided by two of oscin

FIG. 8A

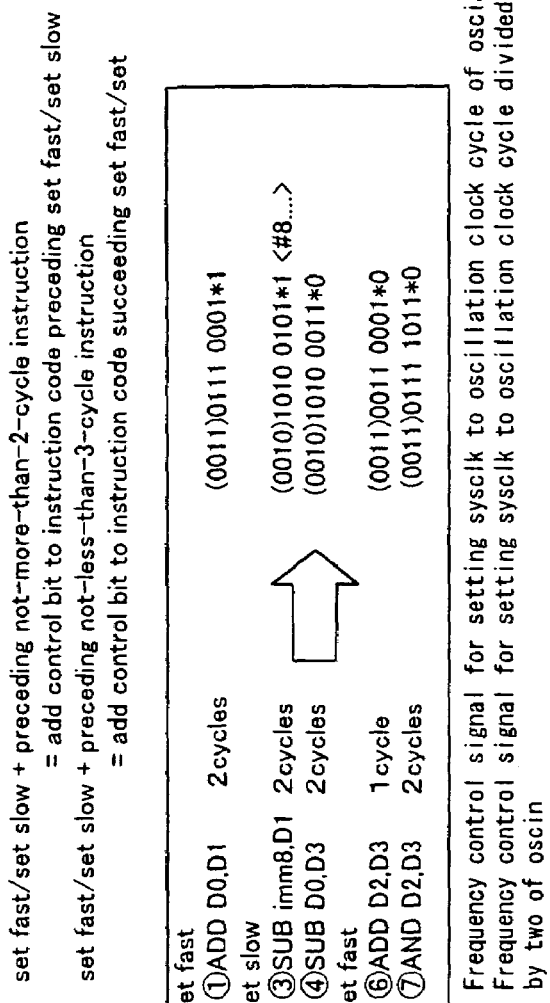

FIG. 8B set fast/set slow + preceding not-more-than-2-cycle instruction
 = add control bit to instruction code preceding set fast/set slow
set fast/set slow + preceding not-less-than-3-cycle instruction
 = add control bit to instruction code succeeding set fast/set

```
set fast
 ①ADD D0,D1    2cycles    (0011)0111 0001*1
set slow
 ③SUB imm8,D1  2cycles    (0010)1010 0101*1 <#8....>
 ④SUB D0,D3    2cycles    (0010)1010 0011*0
set fast
 ⑥ADD D2,D3    1cycle     (0011)0011 0001*0
 ⑦AND D2,D3    2cycles    (0011)0111 1011*0
```

*0: Frequency control signal for setting sysclk to oscillation clock cycle of oscin
*1: Frequency control signal for setting sysclk to oscillation clock cycle divided by two of oscin

FIG. 8C

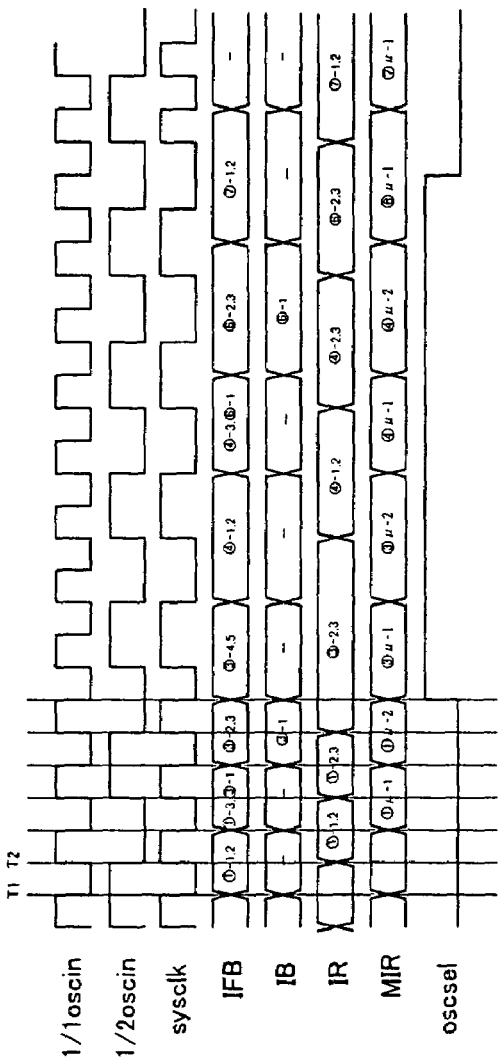

FIG. 9A

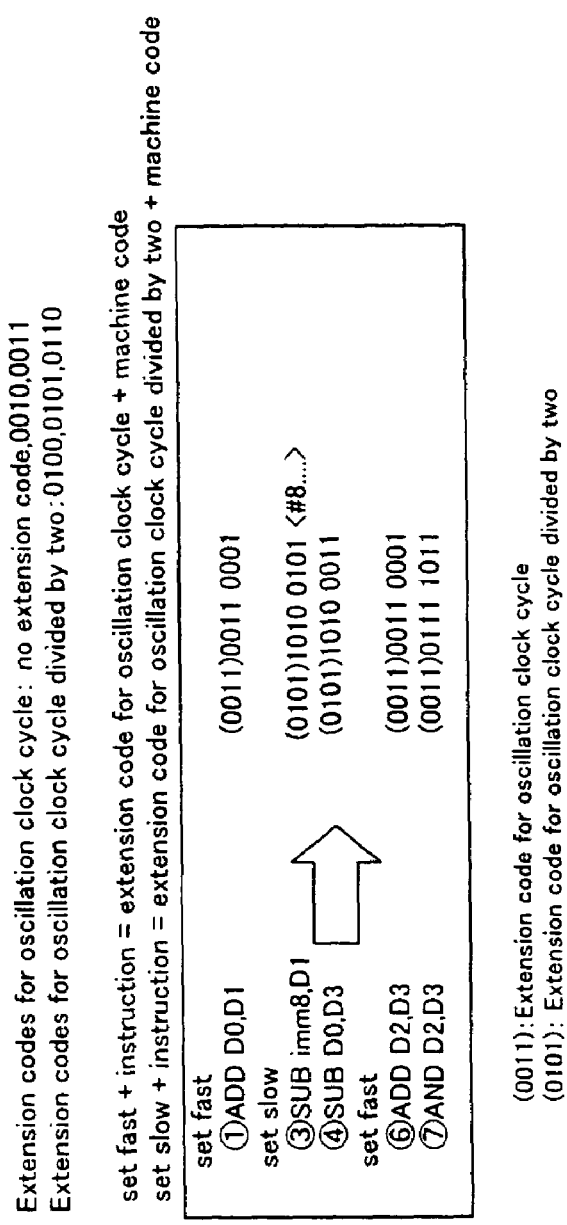

FIG. 9B

Extension codes for oscillation clock cycle: no extension code,0010,0011
Extension codes for oscillation clock cycle divided by two:0100,0101,0110 set fast + instruction = extension code for oscillation clock cycle + machine code
set slow + instruction = extension code for oscillation clock cycle divided by two + machine code set fast
① ADD D0,D1           (0011)0011 0001
set slow
③ SUB imm8,D1        (0101)1010 0101 <#8.....>
④ SUB D0,D3           (0101)1010 0011
set fast
⑥ ADD D2,D3           (0011)0011 0001
⑦ AND D2,D3           (0011)0111 1011

(0011): Extension code for oscillation clock cycle
(0101): Extension code for oscillation clock cycle divided by two S100 Program source
S101 Compiler
S102 Conversion into ROM code
S103 Disposition into ROM FIG. 12A
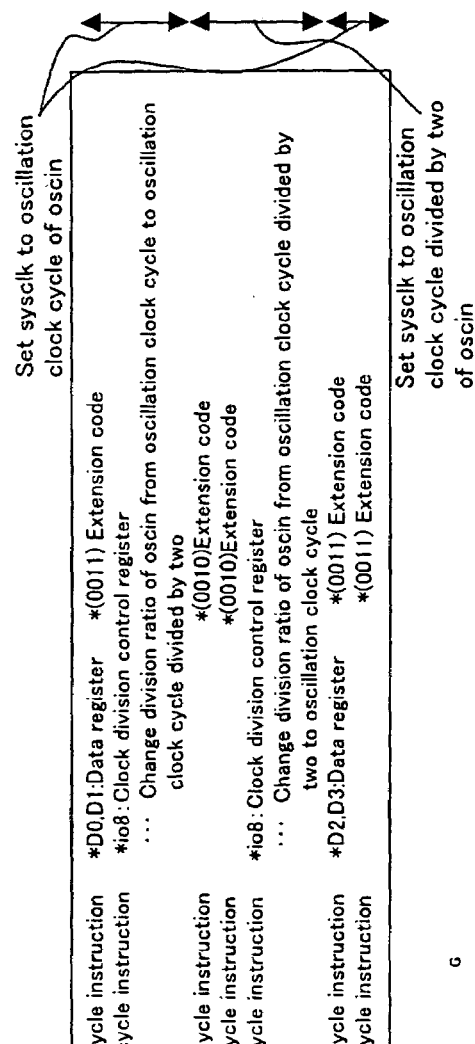
FIG. 12B
FIG. 12C
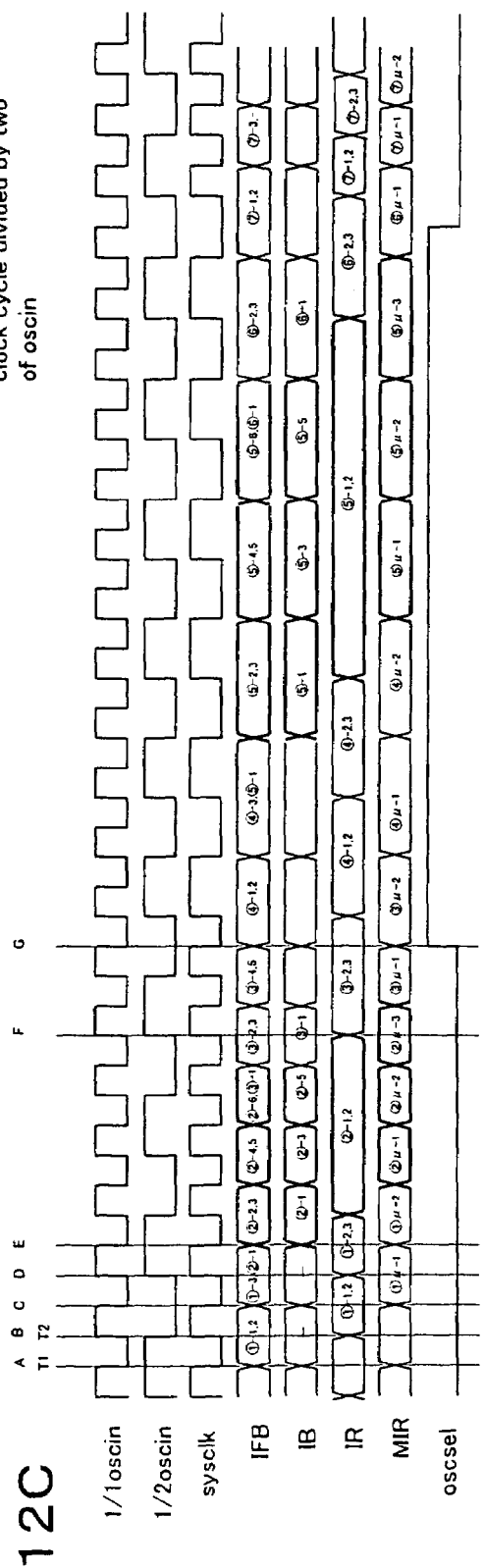

MICROCONTROLLER FOR FETCHING AND DECODING A FREQUENCY CONTROL SIGNAL TOGETHER WITH AN OPERATION CODE

BACKGROUND OF THE INVENTION

1. Field of the Invention

The present invention relates to a microcontroller that operates in synchronism with the system clock, and fetches, decodes and executes an instruction program on a memory such as a ROM by pipeline processing.

2. Prior Art

When a fresh look is taken at a system using a microcontroller from the viewpoint of power consumption reduction, not all tasks require that the microcontroller operate at the highest frequency. It is necessary only that the microcontroller operate at the lowest operating frequency that does not degrade the performance of the system.

With such a case in mind, typical microcontrollers are structured so that the division ratio can be changed in the process of generating the system clock from the original oscillation signal.

Many conventional microcontrollers control the division ratio by setting given data into an address-mapped register. In the case of this structure, since a time loss corresponding to the instruction execution cycle for writing occurs even if power consumption and the operating frequency are finely controlled, there are cases where the intended frequency control and power control effects cannot be obtained. As a measure against these problems, some microcontrollers change the frequency in accordance with the memory space that they access (for example, see Japanese Laid-Open Patent Application No. H02-118811). However, this is not a complete solution to the problems because it is necessary to execute an instruction to jump to the memory space allocated to the frequency to be changed.

A conventional microcontroller as described above will be described. FIGS. 10 and 11 are block diagrams showing the schematic structure of the conventional microcontroller. FIG. 10 shows in detail the structure of a clock generator in the microcontroller. FIG. 11 shows in detail the structure of a CPU in the microcontroller.

In FIG. 10, reference numeral 1000 represents the microcontroller, and reference numeral 100 represents the CPU. The CPU 100 is connected to a ROM 700 through a bus. With a clock generator 800, the CPU 100 not only is connected through a bus but also receives a system clock sysclk from the clock generator 800. The microcontroller 1000 operates in synchronism with the system clock sysclk. The clock generator 800 with the original oscillation signal oscin as the input comprises a clock division circuit 801, a selector 802, a clock division control circuit 803 and a clock division control register 804. The clock division circuit 801 divides the original oscillation signal oscin to generate a plurality of signals of divided oscillation clock cycles as well as a signal of the oscillation clock cycle. The clock division control register 804 is a register where reading and writing can be performed by instructions processed by the CPU 100, and holds information for selecting one of the signals of the divided oscillation clock cycles generated by the clock division circuit 801 based on the set data. The clock division control circuit 803 adjusts the clock switching timing based on the data set in the clock division control register 804, and outputs a control signal oscsel of the selector 802. The selector 802 selects one of the signals of the divided oscillation clock cycles outputted from the clock division circuit 801 in accordance with the control signal oscsel, and transmits it to the CPU 100 as the system clock sysclk.

In FIG. 11, the CPU 100 comprises an instruction decoder 400, a data path 300, a data register 500, an address register 600, and a bus interface 200. Data exchanges in the CPU are performed through the bus interface 200, and the operation of the CPU is controlled by a microcode (MIR).

Next, the typical operation of the microcontroller structured as described above will be described with an 8-bit microcontroller as an example.

First, the data inputted from the ROM 700 passes through the bus interface 200, is fetched into an instruction fetch buffer (IFB) 401 in the instruction decoder 400, passes through an instruction buffer (IB) 402, and then, is divided into an operation code and an operand.

The operation code outputted from the IB 402 is inputted to an instruction register (IR) 403, decoded by a programmable logic array (PLA) 404, and then, supplied as the microcode MIR to each of the following constituent blocks: the bus interface 200; the data path 300; and the instruction decoder 400. These constituent blocks perform the processing in accordance with the inputted microcode MIR.

The operand outputted from the IB 402 is transmitted to the data path 300, the data register 500, the address register 600 or the like in accordance with the microcode MIR.

To change the division ratio of the system clock sysclk, by writing a set value corresponding to each division ratio into the address-mapped clock division control register 804, the switching timing is adjusted by the clock division control circuit 803, the selection signal oscsel is outputted to the selector 802, and in accordance therewith, the selector 802 selects a signal of a divided oscillation clock cycle and transmits it to the CPU 100 as the system clock sysclk.

The operation of the conventional microcontroller as described above will be described by use of a program example and a timing chart.

FIGS. 12A, 12B and 12C show an instruction format, the program example and the operation timing chart of the conventional microcontroller, respectively. The circled numerals in FIGS. 12B and 12C are replaced with (1) to (7) in the following description:

The instruction format comprises a 4-bit extension code representative of the page number of the instruction map, an 8-bit operation code, and a 4×n-bit (n=1,2, . . . ) operand.

The program example executes instructions (1) to (7). The program example first executes the instruction (1) with the system clock sysclk as a signal of the oscillation clock cycle of the original oscillation signal oscin, and then, switches the division ratio from the oscillation clock cycle to the oscillation clock cycle divided by two by the instruction (2). Then, after executing the instructions (3) and (4), the program example returns the division ratio to the oscillation clock cycle by the instruction (5), and executes the instructions (6) and (7). Of the reference designations shown in the timing chart, (1)-1 represents the machine code of the first nibble of the instruction (1) of the program example, and (1) μ-1 represents the first cycle of the execution cycle of the instruction (1). T1 and T2 represent the timings of the falling and rising edges of the system clock sysclk, respectively.

Since the selection signal oscsel is low at the timing A, the system clock sysclk operates in the cycle of 1/1 oscin (signal of the oscillation clock cycle). The IFB 401 and the IB 402 fetch the instructions (1)-1 and (1)-2 from the ROM 700 at T1. Since the instruction (1)-1 is an extension code and (1)-2 is the first nibble of the operation code and not an operand, the data are all outputted to the IR 403. At the timing B, the IR 403 latches (1)-1 and (1)-2 at T2 and outputs them to the PLA 404, and the PLA 404 starts decoding. Since (1)-1 is an extension code and (1)-2 is not processed until the second nibble of the operation code is fetched, at the timing C which is the next T1, only the microcode MIR ((1) μ-1) corresponding to (1)-1 is outputted as an extension code recognition cycle. At the same time, the IFB 401 fetches the instructions (1)-3 and (2)-1. At the timing D, the operation code (1)-3 of the remaining one nibble of the instruction (1) is fetched into the IR 403, and decoded by the PLA 404 together with (1)-2 waiting to be processed. At the timing E, the microcodes MIR ((1)μ-1) of (1)-2 and (1)-3 are outputted, and (2)-2 and (2)-3 are fetched into the IFB 401. Moreover, (2)-1 that is not fetched into the IR 403 at the timing D shifts to the IB 402 at the timing E. When passing through the IFB 401 and the IB 402 like (3)-1, the extension code is not fetched into the IR 403 at the timing F since it is recognized while passing through the IFB 401 and the IB 402, and (3)-2 and (3)-3 which are operation codes are fetched into the IR 403.

By the instruction (2), the selection signal oscsel becomes high at the timing G by the writing into the clock division control register 804 in the execution cycle (2) μ/3 to change the system clock sysclk from 1/1 oscin (signal of the oscillation clock cycle) to 1/2 oscin (signal of the oscillation clock cycle divided by two). Likewise, by the instruction (5), the system clock sysclk is returned from 1/2 oscin to 1/1 oscin.

As described above, the conventional microcontroller is capable of controlling the frequency by an instruction to perform writing into the clock division control register 804.

However, in the conventional microcontroller as described above, to change the frequency, several cycles are required for executing the instruction to perform writing into the register. This makes it impossible to finely adjust power consumption by the frequency control while maintaining the performance of the system.

SUMMARY OF THE INVENTION

The present invention solves the above-mentioned problem, and an object thereof is to provide a microcontroller capable of eliminating the time lag required for changing the frequency and of reducing power consumption by accurately and rapidly performing the frequency control in accordance with the task.

A first microcontroller of the present invention is provided with a processor receiving as a system clock a clock signal corresponding frequency information among a plurality of clock signals of different frequencies that are each 1/n (n is a division ratio and an integer not less than 1) an oscillation frequency, operating in synchronism with the system clock, performing fetching and decoding of an operation code and an operand stored in a memory by pipeline processing, on an instruction program comprising the operation code and the operand, and executing the instruction program based on a result of the decoding. The operation code to which a frequency control signal for determining the division ratio of the system clock is added is stored in the memory. The processor outputs the frequency information corresponding to the frequency control signal by fetching and decoding the frequency control signal together with the operation code by pipeline processing.

According to this structure, since the information for controlling the frequency is processed similarly to the operation code in the pipeline processing, it is unnecessary to write the set data into the frequency control register like in conventional microcontrollers, so that reduction in the power consumption by the microcontroller can be effectively realized by finely controlling the frequency without degrading the performance of the system.

Moreover, a second microcontroller of the present invention is provided with a processor receiving as a system clock a clock signal corresponding to frequency information among a plurality of clock signals of different frequencies that are each 1/n (n is a division ratio and an integer not less than 1) an oscillation frequency, operating in synchronism with the system clock, performing fetching and decoding of an extension code, an operation code and an operand stored in a memory by pipeline processing, on an instruction program comprising the extension code, the operation code and the operand, and executing the instruction program based on a result of the decoding. The operation code is structured, by a machine code, as an instruction map comprising a plurality of pages which instruction map is classified into pages each corresponding to a division ratio. The extension code pipeline-processed together with the operation code is provided with information representative of a page of the instruction map. The processor outputs the frequency information corresponding to the division ratio corresponding to the page of the instruction map represented by the extension code by fetching and decoding the extension code by pipeline processing.

According to this structure, since the existing extension code area is provided with the frequency control information, the circuit scale does not increase, and since the extension code is decoded prior to the operation code, the execution cycle of the instruction where the frequency is to be changed and the frequency change timing are easily synchronized with each other, so that power consumption can be more accurately reduced as intended by the program developer.

Moreover, in the first and second microcontrollers, a clock generator may be provided that generates the plurality of clock signals of different frequencies that are each 1/n (n is a division ratio and an integer not less than 1) the oscillation frequency, selects from among the clock signals a clock signal corresponding to the frequency information outputted from the processor, and outputs the selected clock signal as the system clock to the processor.

Moreover, this clock generator comprises: dividing means for outputting the plurality of clock signals of the different frequencies that are each 1/n (n is a division ratio and an integer not less than 1) the oscillation frequency; selecting means for selecting one clock signal based on a selection signal from among the plurality of clock signals outputted by the dividing means, and outputting the selected clock signal as the system clock; and control means for outputting the selection signal corresponding to the frequency information outputted from the processor, to the selecting means.

Moreover, in the first microcontroller, means may be provided for generating the frequency control signal in accordance with a division ratio setting description determining the division ratio of the system clock described in a source program, adding the frequency control signal to the operation code generated from an instruction succeeding the division ratio setting description, and converting it into a ROM code.

With this, the addition of the frequency control signal to the operation code can be automatically converted into a machine code by a complier without any load on the program developer.

Moreover, in the first microcontroller, means may be provided for generating the frequency control signal in accordance with a division ratio setting description determining the division ratio of the system clock described in a source program, adding the frequency control signal to the operation code generated from an instruction preceding the division ratio setting description when the number of execution cycles of the instruction preceding the division ratio setting description is less than a reference, adding the frequency control signal to the operation code generated from an instruction succeeding the division ratio setting description when the number of execution cycles is not less than the reference, and converting it into a ROM code.

With this, the error between the execution cycle of the instruction where the frequency is to be changed and the frequency change timing due to the processing time for the frequency control signal to be decoded and executed together with the operation code can be reduced.

Moreover, in the second microcontroller, means may be provided for selecting the extension code corresponding to the division ratio in accordance with a division ratio setting description determining the division ratio of the system clock described in a source program, selecting the operation code corresponding to an instruction succeeding the division ratio setting description from the page of the instruction map represented by the extension code, and converting it into a ROM code.

With this, the setting of the division ratio of the system clock and the selection of the instruction code corresponding to the division ratio can be automatically converted into a machine code by the particular division ratio setting description by a compiler without any load on the program developer.

BRIEF DESCRIPTION OF THE DRAWINGS

FIG. 3A is a view showing an instruction format of the microcontroller according to the first embodiment of the present invention;

FIG. 3B is a view showing a program example of the microcontroller according to the first embodiment of the present invention;

FIG. 3C is an operation timing chart of the microcontroller according to the first embodiment of the present invention;

FIG. 6A is a view showing an instruction format of the microcontroller according to the second embodiment of the present invention;

FIG. 6B is a view showing a program example of the microcontroller according to the second embodiment of the present invention;

FIG. 6C is an operation timing chart of the microcontroller according to the second embodiment of the present invention;

FIG. 8A is a flowchart showing the procedure of generating a machine code and disposing it into a ROM in a microcontroller according to a fourth embodiment of the present invention;

FIG. 8B is a view showing a method of generating the machine code from a program source by a compiler in the fourth embodiment of the present invention;

FIG. 8C is an operation timing chart of the microcontroller according to the fourth embodiment of the present invention;

FIG. 9A is a flowchart showing the procedure of generating a machine code and disposing it into a ROM in a microcontroller according to a fifth embodiment of the present invention;

FIG. 9B is a view showing a method of generating the machine code from a program source by a compiler in the fifth embodiment of the present invention;

FIG. 12A is a view showing the instruction format of the conventional microcontroller;

FIG. 12B is a view showing the program example of the conventional microcontroller; and FIG. 12C is the operation timing chart of the conventional microcontroller.

DESCRIPTION OF THE PREFERRED EMBODIMENTS

Hereinafter, embodiments of the present invention will be concretely described with reference to the drawings.

First Embodiment

Figure 1:
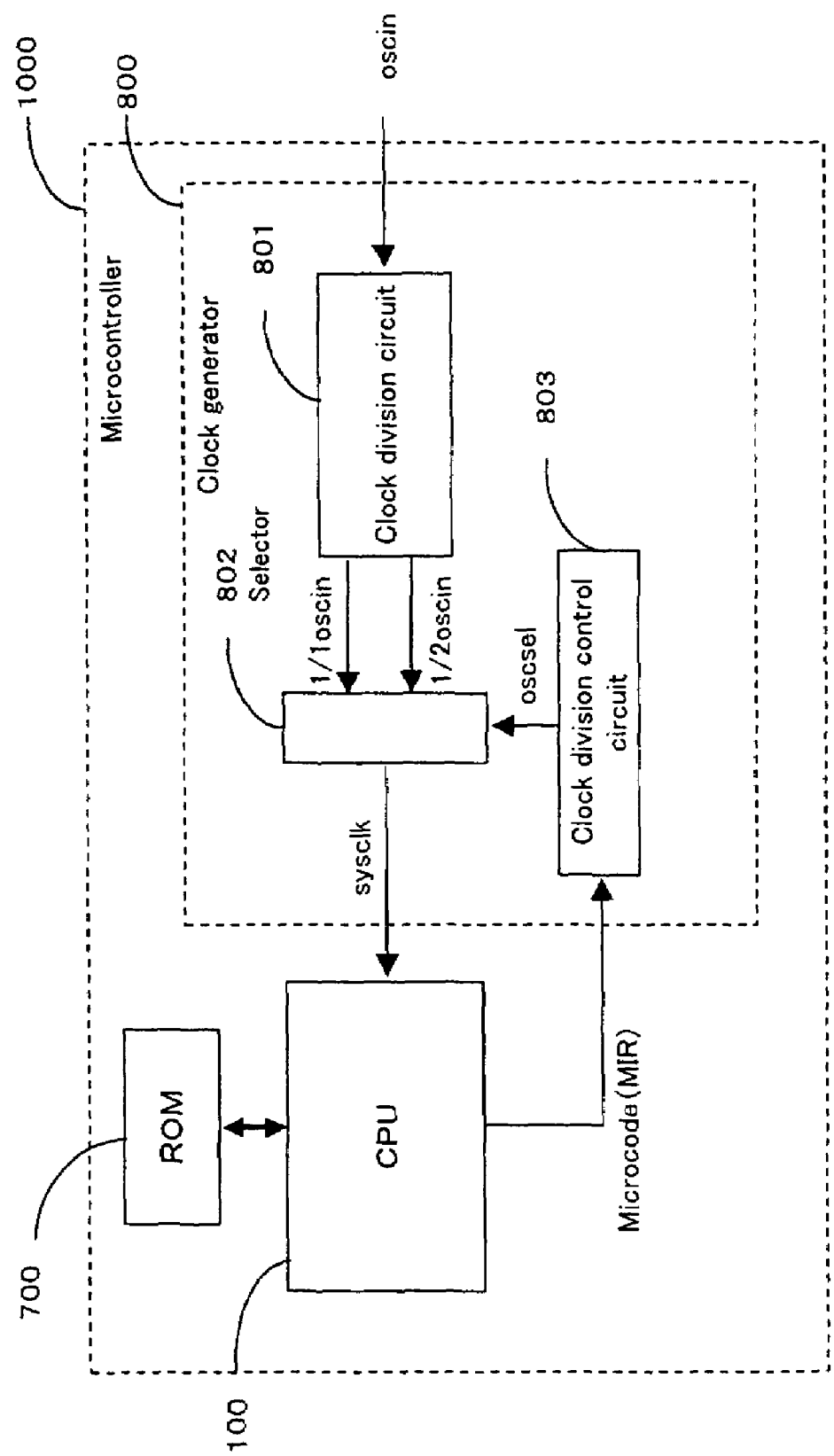
FIG. 1 is a block diagram showing the schematic structure of a microcontroller according to a first embodiment of the present invention.
Figure 2:
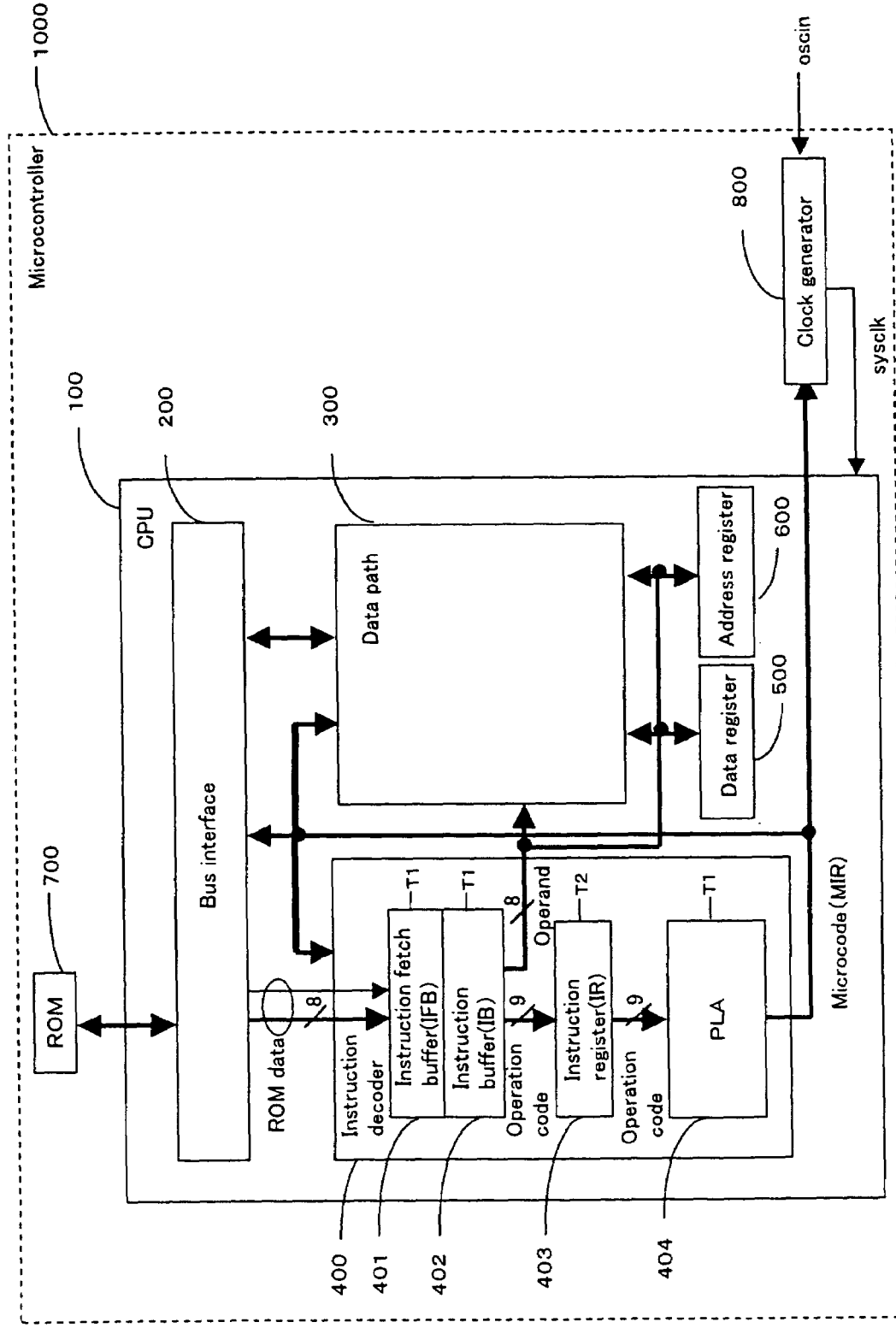
FIG. 2 is a block diagram showing the schematic structure of the microcontroller according to the first embodiment of the present invention.

A microcontroller according to a first embodiment of the present invention will be described. FIGS. 1 and 2 are block diagrams showing the schematic structure of the microcontroller according to the first embodiment. FIG. 1 shows in detail the structure of a clock generator in the microcontroller. FIG. 2 shows in detail the structure of the CPU in the microcontroller.

In FIG. 1, reference numeral 1000 represents the microcontroller, and reference numeral 100 represents the CPU. The CPU 100 and a ROM 700 are connected together through a bus. A clock generator 800 with an original oscillation signal oscin as the input comprises a clock division circuit 801, a selector 802 and a clock division control circuit 803, and determines the division ratio of a system clock sysclk from a microcode MIR outputted from the CPU 100 and transmits it to the CPU 100. The microcontroller 1000 operates in synchronism with the system clock sysclk. The clock division circuit 801 divides the original oscillation signal oscin to generate a plurality of signals of divided oscillation clock cycles as well as a signal of the oscillation clock cycle. The clock division control circuit 803 adjusts the clock switching timing based on the microcode MIR outputted from the CPU 100, and outputs a control signal oscsel of the selector 802. The selector 802 selects one of the signals of the divided oscillation clock cycles outputted from the clock division circuit 801 in accordance with the control signal oscsel, and transmits it to the CPU 100 as the system clock sysclk.

In FIG. 2, the CPU 100 comprises an instruction decoder 400, a data path 300, a data register 500, an address register 600, and a bus interface 200. Data exchanges in the CPU are performed through the bus interface 200, and the operation of the CPU is controlled by a microcode (MIR).

Next, the operation of the microcontroller according to the first embodiment structured as described above will be described.

First, the data inputted from the ROM 700 is fetched into an instruction fetch buffer (IFB) 401 in the instruction decoder 400 through the bus interface 200, passes through an instruction buffer (IB) 402, and then, is divided into an operation code and an operand.

The operation code outputted from the IB 402 is inputted to an instruction register (IR) 403, decoded by a programmable logic array (PLA) 404, and then, supplied as the microcode MIR to each of the following constituent blocks: the bus interface 200; the data path 300; and the instruction decoder 400. These constituent blocks perform the processing in accordance with the inputted microcode MIR.

The operand outputted from the IB 402 is transmitted to the data path 300, the data register 500, the address register 600 or the like in accordance with the microcode MIR.

The mechanism to change the division ratio of the system clock sysclk is such that the frequency control signal added to the operation code is decoded together with the operation code, and transmitted to the clock division control circuit 803 as the microcode MIR. The clock division control circuit 803 adjusts the switching timing based on the transmitted microcode MIR, and outputs the selection signal oscsel to the selector 802. The selector 802 selects a signal of a divided oscillation clock cycle, and transmits it to the CPU 100 as the system clock sysclk.

The operation of the microcontroller according to the first embodiment as described above will be described by use of a program example and a timing chart.

FIGS. 3A, 3B and 3C show an instruction format, the program example and the operation timing chart of the microcontroller according to the first embodiment, respectively. In this description, an operation to switch the division ratio of the system clock sysclk from the oscillation clock cycle to the oscillation clock cycle divided by two of the original oscillation signal oscin and return it to the oscillation clock cycle is shown with an 8-bit microcontroller as an example. The circled numerals in FIGS. 3B and 3C are replaced with (1) to (7) in the following description:

The instruction format comprises a 4-bit extension code representative of the page number of the instruction map, an 8-bit operation code, a 1-bit frequency control signal (frequency control bit) added to the operation code, and a 4×n-bit (n=1,2, . . . ) operand.

The program example executes instructions (1) to (7). At the instruction (3), the division ratio of the system clock sysclk is switched from the oscillation clock cycle to the oscillation clock cycle divided by two of the original oscillation signal oscin, and at the instruction (6), the division ratio is returned to the oscillation clock cycle. The frequency control signal added to the operation code is represented by *0 or *1. In the case of *0, the oscillation clock cycle is selected, and in the case of *1, the oscillation clock cycle divided by two is selected. Of the reference designations shown in the timing chart, (1)-1 represents the machine code of the first nibble of the instruction (1) of the program example, and (1) μ-1 represents the first cycle of the execution cycle of the instruction (1). T1 and T2 represent the timings of the falling and rising edges of the system clock sysclk, respectively.

Since the selection signal oscsel is low at the timing A, the system clock sysclk operates in the cycle of 1/1 oscin (signal of the oscillation clock cycle). The IFB 401 and the IB 402 fetch the instructions (1)-1 and (1)-2 from the ROM 700 at T1. Since the instruction (1)-1 is an extension code and (1)-2 is the first nibble of the operation code and not an operand, the data are all outputted to the IR 403. At the timing B, the IR 403 latches (1)-1 and (1)-2 at T2 and outputs them to the PLA 404, and the PLA 404 starts decoding. Since (1)-1 is an extension code and (1)-2 is not processed until the second nibble of the operation code is fetched, at the timing C which is the next T1, only the microcode MIR ((1) μ-1) corresponding to (1)-1 is outputted as an extension code recognition cycle. At the same time, the IFB 401 fetches the instructions (1)-3 and (3)-1. At the timing D, the operation code (1)-3 of the remaining one nibble of the instruction (1) is fetched into the IR 403, and decoded by the PLA 404 together with (1)-2 waiting to be processed. At the timing E, the microcodes MIR ((1) μ-2) of (1)-2 and (i)-3 are outputted, and (3)-2 and (3)-3 are fetched into the IFB 401. Moreover, (3)-1 that is not fetched into the IR 403 at the timing D shifts to the IB 402 at the timing E. When passing through the IFB 401 and the IB 402 like (3)-1, the extension code is not fetched into the IR 403 at the timing F since it is recognized while passing through the IFB 401 and the IB 402, and (3)-2 and (3)-3 which are operation codes are fetched into the IR 403.

Since having information on the control of the oscillation clock cycle divided by two (*1) in the frequency control signal added thereto, (3)-3 is outputted to the clock generator 800 as the microcode MIR in the cycle of (3) μ-1. The clock division control circuit 803 adjusts the switching timing, and at the timing G, the selection signal oscsel is made high and the system clock sysclk is switched to 1/2 oscin (signal of the oscillation clock cycle divided by two). Likewise, the system clock sysclk is returned to 1/1 oscin by the frequency control signal added to the instruction (6).

The added frequency control signal is not limited to a signal of one bit but there are cases where it is a signal of several bits according to the specifications of the microcontroller.

As described above, according to the first embodiment, by adding to the operation code the frequency control signal for determining the division ratio of the system clock, the frequency control signal is processed in the pipeline like the operation code, so that the time for writing the set data into the frequency control register (804) which time is necessary for conventional microcontrollers is unnecessary. Consequently, reduction in the power consumption by the microcontroller can be effectively realized without the performance of the system being degraded. While the present embodiment is described with an 8-bit microcontroller as an example, as the number of bits increases, the effects of the additional bits on the circuit scale become extremely small and the effects of the present invention increase.

Second Embodiment

A microcontroller according to a second embodiment of the present invention will be described.

Figure 4:
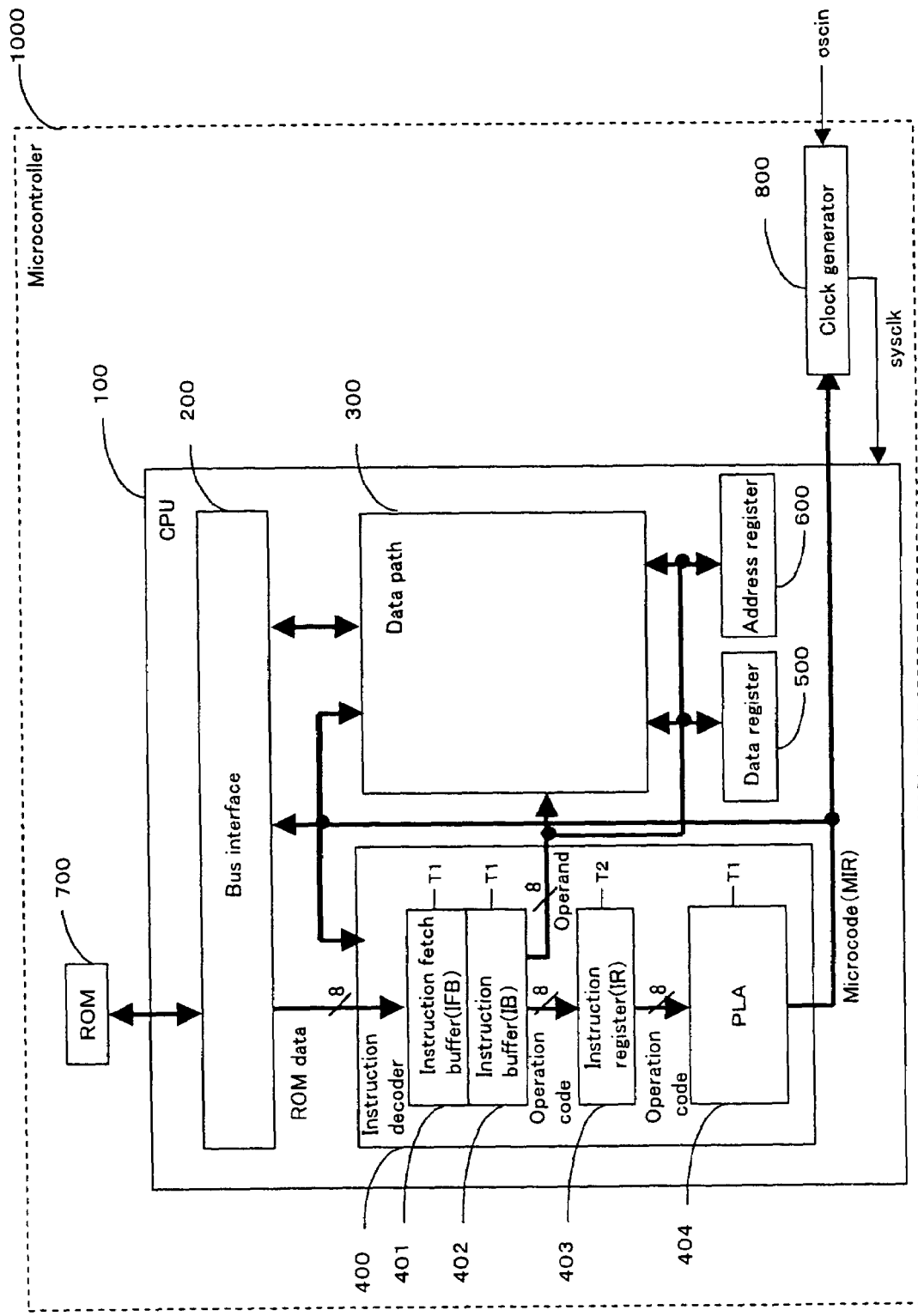
FIG. 4 is a block diagram showing the schematic structure of a microcontroller according to a second embodiment of the present invention.

FIG. 4 is a block diagram showing the schematic structure of the microcontroller according to the second embodiment. In the second embodiment, the frequency control signal is not added to the operation code transmitted through the IFB 401, the IB 402, the IR 403 and the PLA 404 unlike in the first embodiment, and the operation code comprises 8 bits. Except this, the schematic structure is similar to that of the microcontroller of the first embodiment. Therefore, the internal structure of the clock generator 800 is the same as FIG. 1.

Next, the operation of the microcontroller according to the second embodiment structured as described above will be described.

Figure 5B:
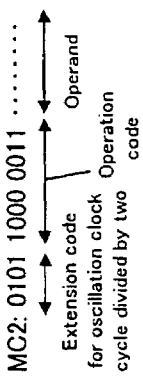
FIGS. 5A and 5B are explanatory views of an instruction map of the microcontroller according to the second embodiment of the present invention.
Figure 5A:
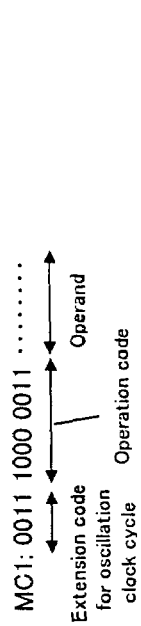

FIGS. 5A and 5B show an example of the instruction map of the microcontroller of the second embodiment. The instruction map comprises a plurality of pages, and is classified into pages for each division ratio. Therefore, according to the extension code representative of the page number of the instruction map, the instruction is executed at a different frequency even if the operation code is the same. For example, an instruction map A and an instruction map B correspond to the oscillation clock cycle and the oscillation clock cycle divided by two and are classified by extension codes '0011' and '0101,' respectively. MC1 and MC2 in the map are both instructions of the same execution contents, and the machine codes other than the extension code are the same. When these codes are processed by the CPU, MC1 and MC2 perform the same operation in the oscillation clock cycle and in the oscillation clock cycle divided by two, respectively. As described above, the extension code corresponding to the division ratio is decoded similarly to the operation code in the pipeline processing, and is transmitted to the clock division control circuit 803 as the microcode MIR. The clock division control circuit 803 adjusts the switching timing based on the transmitted microcode MIR, and outputs the selection signal oscsel to the selector 802. In response thereto, the selector 802 selects a signal of a divided oscillation clock cycle, and transmits it to the CPU 100 as the system clock sysclk.

The operation of the microcontroller according to the second embodiment as described above will be described by use of a program example and a timing chart.

FIGS. 6A, 6B and 6C show an instruction format, the program example and the operation timing chart of the microcontroller according to the second embodiment, respectively. In this description, like in the description of the operation of the microcontroller according to the first embodiment, an operation to switch the division ratio of the system clock sysclk from the oscillation clock cycle to the oscillation clock cycle divided by two of the original oscillation signal oscin and return it to the oscillation clock cycle is shown with an 8-bit microcontroller as an example. The circled numerals in FIGS. 6B and 6C are replaced with (1) to (7) in the following description:

The instruction format comprises a 4-bit extension code representative of the page number of the instruction map, an 8-bit operation code, and a 4×n-bit (n=1,2, . . . ) operand. The difference from the microcontroller of the first embodiment is only that the frequency control signal is not added.

The program example executes instructions (1) to (7). At the instruction (3), the division ratio of the system clock sysclk is switched from the oscillation clock cycle to the oscillation clock cycle divided by two of the original oscillation signal oscin, and at the instruction (6), the division ratio is returned to the oscillation clock cycle. The extension code '0011' indicates that the instruction is for setting the system clock sysclk to the oscillation clock cycle of the original oscillation signal oscin, and the extension code '0101' indicates that the instruction is for setting the system clock sysclk to the oscillation clock cycle divided by two.

Since the selection signal oscsel is low at the timing A, the system clock sysclk operates in a cycle of 1/1 oscin (signal of the oscillation clock cycle). The IFB 401 and the IB 402 fetch the instructions (1)-1 and (1)-2 from the ROM 700 at T1. Since the instruction (1)-1 is an extension code and (1)-2 is the first nibble of the operation code and not an operand, the data are all outputted to the IR 403. At the timing B, the IR 403 latches (1)-1 and (1)-2 at T2 and outputs them to the PLA 404, and the PLA 404 starts decoding. Since (1)-1 is an extension code and (1)-2 is not processed until the second nibble of the operation code is fetched, at the timing C which is the next T1, only the microcode MIR ((1) μ-1) corresponding to (1)-1 is outputted as an extension code recognition cycle. At the same time, the IFB 401 fetches the instructions (1)-3 and (3)-1. At the timing D, the operation code (1)-3 of the remaining one nibble of the instruction (1) is fetched into the IR 403, and decoded by the PLA 404 together with (1)-2 waiting to be processed. At the timing E, the microcodes MIR ((1) μ-2) of (1)-2 and (1)-3 are outputted, and (3)-2 and (3)-3 are fetched into the IFB 401. Moreover, (3)-1 that is not fetched into the IR 403 at the timing D shifts to the IB 402 at the timing E. When passing through the IFB 401 and the IB 402 like (3)-1, the extension code is not fetched into the IR 403 at the timing F since it is recognized while passing through the IFB 401 and the IB 402, and (3)-2 and (3)-3 which are operation codes are fetched into the IR 403.

The extension code (3)-1 has information '0101' on the control of the oscillation clock cycle divided by two, is decoded while passing through the IFB 401 and the IB 402, and is outputted to the clock generator 800 as the microcode MIR. The clock division control circuit 803 adjusts the switching timing, and at the timing G, the selection signal oscsel is made high and the system clock sysclk is switched to 1/2 oscin (signal of the oscillation clock cycle divided by two). Likewise, the system clock sysclk is returned to 1/1 oscin by the extension code of the instruction (6). Since the extension code is fetched and decoded prior to the operation code, (3) μ-1, (3) μ-2, (4) μ-1 and (4) μ-2 that are to be operated in the oscillation clock cycle divided by two and (6) μ-1, (7) μ-1 and (7) μ-2 that are to be operated in the oscillation clock cycle can be executed as assumed.

As described above, according to the second embodiment, by providing the extension code with information for determining the division ratio of the system clock, the extension code can be decoded in an earlier cycle than the operation code, so that the time lag for changing the frequency can be minimized and this enables the program developer to more easily and precisely perform the frequency control. Consequently, the power consumption by the microcontroller can be reduced by eliminating the time lag required to change the frequency and accurately and rapidly performing the frequency control in accordance with the task.

The instruction is not limited to the two kinds of the oscillation clock cycle and the oscillation clock cycle divided by two, but there are cases where several kinds of instructions are used according to the specifications of the microcontroller. Moreover, it is unnecessary that the same number of instructions be present for each division ratio, but, for example, with respect to the instruction corresponding to the default division ratio, the number of instructions corresponding to the other division ratios can be limited to several.

While in the microcontroller 1000 in the above-described first and second embodiments, the clock generator 800 generating the system clock is incorporated like inmost typical microcontrollers, the clock generator 800 may be externally attached.

As described above in the first and second embodiments, by adding the information for controlling the frequency to the operation code or providing the extension code with the information, frequency control can be performed in the pipeline processing, so that the power consumption by the microcontroller can be reduced by eliminating the time lag required to change the frequency and accurately and rapidly performing the frequency control in accordance with the task.

Third Embodiment

A microcontroller according to a third embodiment of the present invention will be described.

Figure 7A:
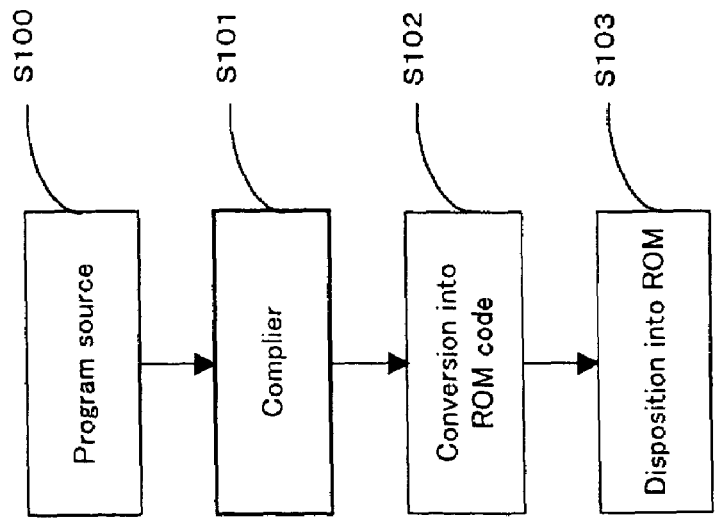
FIG. 7A is a flowchart showing the procedure of generating a machine code and disposing it into a ROM in a microcontroller according to a third embodiment of the present invention.
Figure 7B:
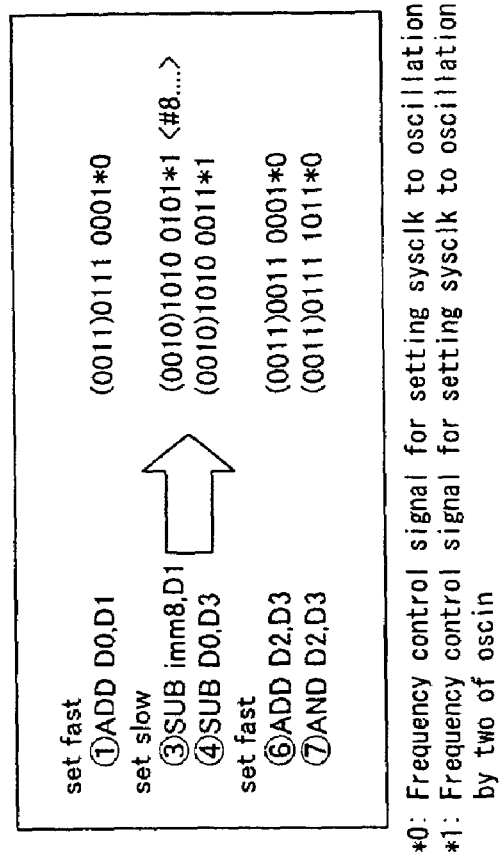
FIG. 7B is a view showing a method of generating the machine code from a program source by a compiler in the third embodiment of the present invention.
Figure 10:
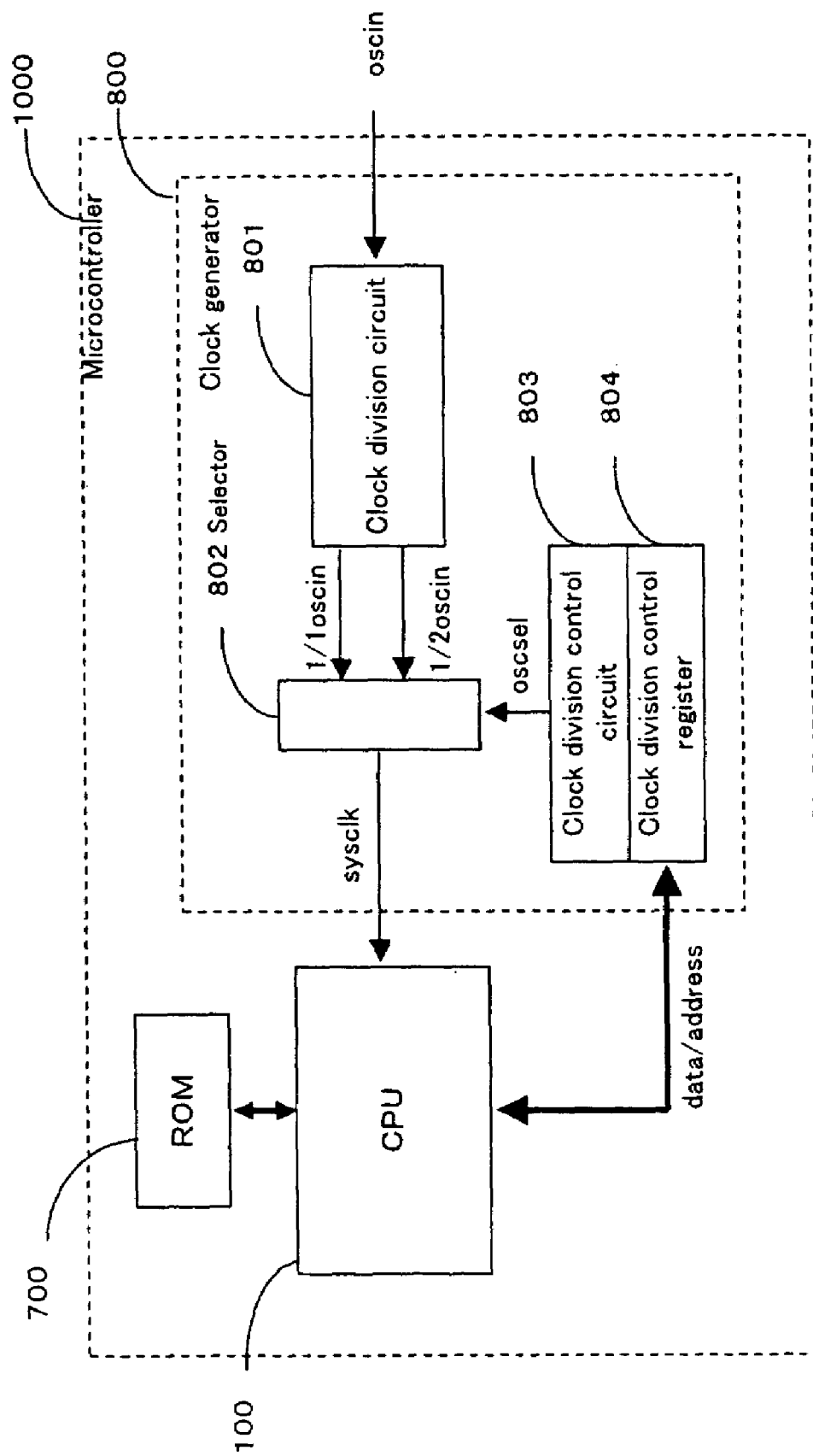
FIG. 10 is a block diagram showing the typical schematic structure of the conventional microcontroller.
Figure 11:
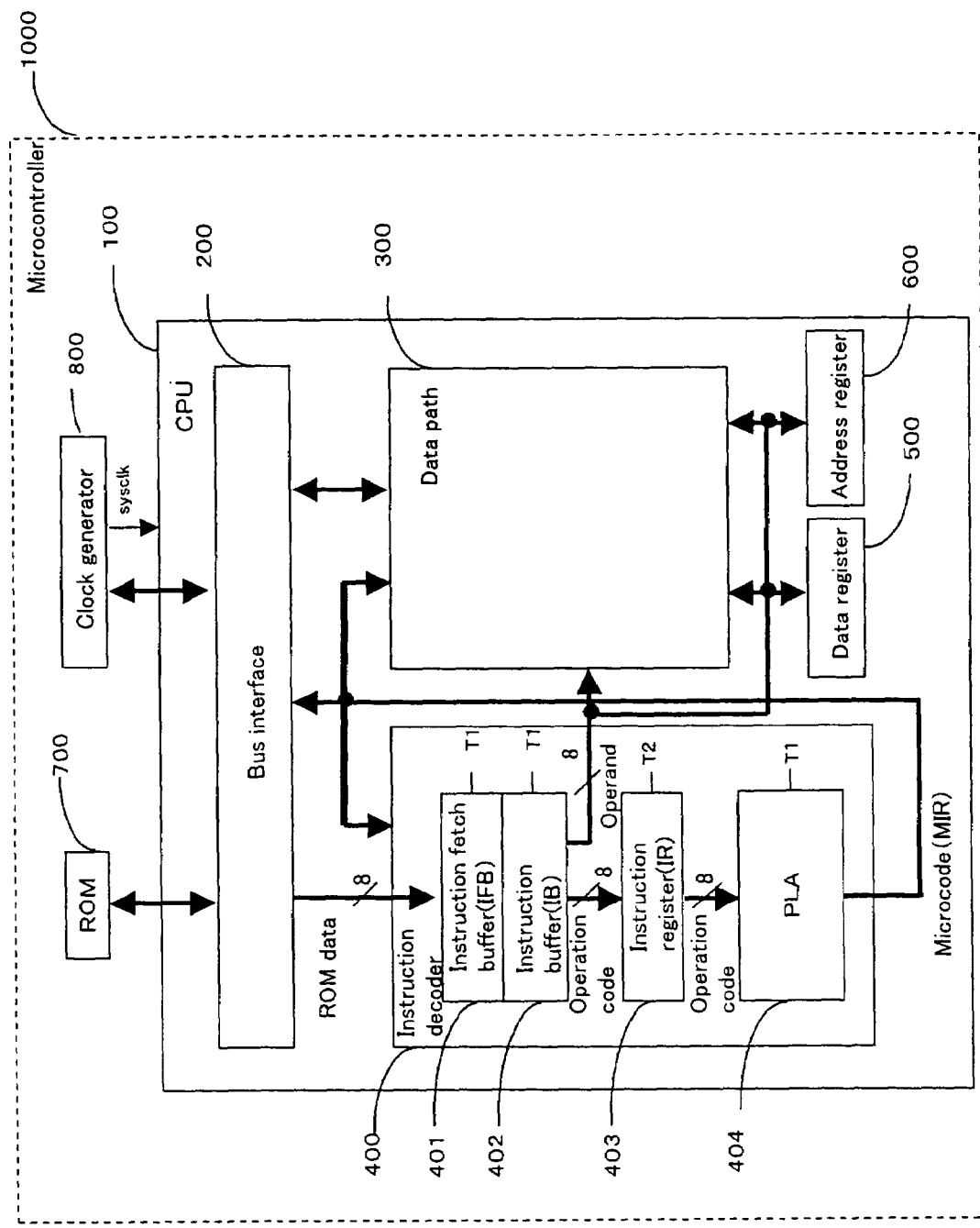
FIG. 11 is a block diagram showing the typical schematic structure of the conventional microcontroller.

FIG. 7A is a flowchart showing the procedure of generating a machine code and disposing it into a ROM in the microcontroller according to the third embodiment. FIG. 7B is a view showing a method of generating the machine code from a program source by a compiler in the third embodiment. The circled numerals in FIG. 7B are replaced with (1) to (7) in the following description:

As shown in FIG. 7A, normally, the program source created by a program development is converted into a ROM code based on a data file generated by a complier or the like, and then, generated as a layout pattern and disposed into a ROM. However, according to conventional machine code generation flows, it is impossible to add the frequency control signal to the machine code like in the microcontroller of the first embodiment.

According to the machine code generation flow of the third embodiment, the frequency control signal can be added to the machine code by inserting a division ratio setting description in the program source. For example, like the program example of FIG. 7B, programming is performed in the order of instructions (1), (3), (4), (6) and (7). When the instructions (1), (6) and (7) are to be executed in the oscillation clock cycle and the instructions (3) and (4) are to be executed in the oscillation clock cycle divided by two, a description 'set fast' is inserted in front of the instruction (1), a description 'set slow' is inserted in front of the instruction (3), and the description 'set fast' is inserted in front of the instruction (6). With the instruction and the preceding 'set fast' or 'set slow' information as the input, the complier converts the instruction into a machine code, adds '0' to the operation code when the preceding division setting description is 'set fast', and adds '1' when the preceding division setting description is 'set slow.' When there is no description preceding the instruction, the additional signal of the previous machine code is continued.

That is, in the microcontroller according to the third embodiment, in the structure of the above-described first embodiment, the above-described compiler, means for converting the machine code generated by the complier into a ROM code and means for disposing it into a ROM are provided.

As described above, according to the third embodiment, the addition of the frequency control signal to the operation code can be automatically converted into a machine code by a complier without any load on the program developer, so that the characteristics of the microcontroller of the first embodiment can be taken advantage of.

Fourth Embodiment

A microcontroller according to a fourth embodiment of the present invention will be described.

FIG. 8A is a flowchart showing the procedure of generating a machine code and disposing it into a ROM in the microcontroller according to the fourth embodiment. FIG. 8B is a view showing a method of generating the machine code from a program source by a compiler in the fourth embodiment. FIG. 8C is an operation timing chart of the microcontroller according to the fourth embodiment. Although the procedure of the disposition into a ROM is similar to that of the third embodiment, the generation rule is different in the process of generating the machine code from the program source by the complier. The circled numerals in FIGS. 8B and 8C are replaced with (1) to (7) in the following description:

While the frequency control signal added to the operation code is determined based on 'set fast' or 'set slow' in the third embodiment, in the microcontroller of the first embodiment, when the division ratio is changed, since the frequency control signal is added to the operation code, time is somewhat required for executing fetching and decoding and switching the selection signal oscsel. For this reason, there are cases where the execution is late for the instruction execution timing when the division ratio is to be switched. In these cases, a detailed examination of the frequency control by the program developer is required.

In the machine code generation flow of the present embodiment, when the machine codes of the instructions (1) to (7) are generated like in the third embodiment, the frequency control signal is determined based on the division ratio setting description and the execution cycle of the preceding instruction.

For example, although the description 'set slow' preceding the instruction (3) is inserted in order that the instruction (3) operates in the oscillation clock cycle divided by two, in the first embodiment, since the description is added to the operation code as shown in FIGS. 3A to 3C, the switching of the selection signal oscsel is delayed, and in actuality, the switching is made at the execution cycle ((4) μ-1) of the instruction (4). As a measure thereagainst, to execute the instruction (3) in the oscillation clock cycle divided by two, by providing the preceding instruction (1) with an additional signal of the control of the oscillation clock cycle divided by two, the division ratio is switched to the oscillation clock cycle divided by two just at the execution timing G of (3) μ-1. However, when the execution cycle of the instruction (1) is long, the processing frequency of the instruction (1) is the oscillation clock cycle divided by two. In the fourth embodiment, when the execution cycle of the instruction preceding 'set fast' or 'set slow' is less than the reference cycle, the frequency control signal is added to the machine code of the preceding instruction, and when the execution cycle is not less than the reference cycle, the frequency control signal is added to the machine code of the succeeding instruction. In the example of FIG. 8B, the reference cycle is three cycles. When the execution cycle of the instruction preceding 'set fast' or 'set slow' is less than three cycles (that is, not more than two cycles), the frequency control signal is added to the machine code of the preceding instruction, and when the cycle is not less than three cycles, the frequency control signal is added to the machine code of the succeeding machine code.

That is, in the microcontroller according to the fourth embodiment, in the structure of the above-described first embodiment, the above-described compiler, means for converting the machine code generated by the complier into a ROM code and means for disposing it into a ROM are provided.

As described above, according to the fourth embodiment, since the addition of the frequency control signal to the operation code is determined in accordance with the number of execution cycles of the instruction, frequency control can be more precisely performed at the intended timing, so that since it is unnecessary for the program developer to perform programming in consideration of the number of execution cycles, program development efficiency can be improved.

Fifth Embodiment

A microcontroller according to a fifth embodiment of the present invention will be described.

FIG. 9A is a flowchart showing the procedure of generating a machine code and disposing it into a ROM in the microcontroller according to the fifth embodiment. FIG. 9B is a view showing a method of generating the machine code from a program source by a compiler in the fifth embodiment. Although the procedure of the disposition into a ROM is similar to that of the third embodiment, the generation rule is different in the process of generating the machine code from the program source from the complier. The circled numerals in FIG. 9B are replaced with (1) to (7) in the following description:

In the machine code generation flow of the present embodiment, the extension code corresponding to the division ratio set by inserting the division ratio setting description in the program source is selected, and the instruction succeeding the division ratio setting description is converted into the corresponding machine code in the instruction map classified according to the extension code. For example, like the program example of FIG. 9B, programming is performed in the order of instructions (1), (3), (4), (6) and (7). When the instructions (1), (6) and (7) are to be executed in the oscillation clock cycle and the instructions (3) and (4) are to be executed in the oscillation clock cycle divided by two, the description 'set fast' is inserted in front of the instruction (1), the description 'set slow' is inserted in front of the instruction (3), and the description 'set fast' is inserted in front of the instruction (6). The instruction map is classified by no extension code, an extension code '0010' and an extension code '0011' in the case of the instructions executed in the oscillation clock cycle and by an extension code '0100,' an extension code '0101' and an extension code '0110' in the case of the instructions executed in the oscillation clock cycle divided by two. With respect to the instructions handled by the microcontroller according to the fifth embodiment, the instructions of the oscillation clock cycle and the instructions of the oscillation clock cycle divided by two have the same operation codes except for the extension code like the example of FIGS. 5A and 5B described in the second embodiment, and perform the same operation. With the instruction and the preceding 'set fast' or 'set slow' information as the input, the complier converts the instruction into the machine code of the map of the instructions executed in the oscillation clock cycle when the preceding description is 'set fast,' and converts the instruction into the machine code of the map of the instructions executed in the oscillation clock cycle divided by two when the description is 'set slow.' When there is no description preceding the instruction, determining that there is no change in division frequency, the complier converts the instruction into the machine code of the instructions of the same division ratio as that of the preceding instruction.

That is, in the microcontroller according to the fifth embodiment, in the structure of the above-described second embodiment, the above-described compiler, means for converting the machine code generated by the complier into a ROM code and means for disposing it into a ROM are provided.

As described above, according to the fifth embodiment, the setting of the division ratio can be reflected in the machine code only by the insertion of the division ratio setting description, so that a program development environment that makes the most of the characteristics of the microcontroller of the second embodiment can be provided.

What is claimed is:

1. A microcontroller having a processor receiving as a system clock a clock signal corresponding to frequency information among a plurality of clock signals of different frequencies that are each 1/n (n is a division ratio and an integer not less than 1) an oscillation frequency, operating in synchronism with the system clock, performing fetching and decoding of an extension code, an operation code and an operand stored in a memory by pipeline processing, on an instruction program comprising the extension code, the operation code and the operand, and executing the instruction program based on a result of the decoding, wherein the operation code is structured, by a machine code, as an instruction map comprising a plurality of pages which instruction map is classified into pages each corresponding to a division ratio, wherein the extension code pipeline-processed together with the operation code is provided with information representative of a page of the instruction map, wherein the processor outputs the frequency information corresponding to the division ratio corresponding to the page of the instruction map represented by the extension code by fetching and decoding the extension code by pipeline processing, and wherein a selector is provided that selects the extension code corresponding to the division ratio in accordance with a division ratio setting description determining the division ratio of the system clock described in a source program, selects the operation code corresponding to an instruction succeeding the division ratio setting description from the page of the instruction map represented by the extension code, and converts it into a ROM code.

2. A microcontroller according to claim 1, wherein a clock generator is provided that generates the plurality of clock signals of different frequencies that are each 1/n (n is a division ratio and an integer not less than 1) the oscillation frequency, selects from among the clock signals a clock signal corresponding to the frequency information outputted from the processor, and outputs the selected clock signal as the system clock to the processor.

3. A microcontroller according to claim 2, wherein the clock generator comprises:

a divider that outputs the plurality of clock signals of the different frequencies that are 1/n (n is a division ratio and an integer not less than 1) the oscillation frequency;

a clock signal selector that selects one clock signal based on a selection signal from among the plurality of clock signals outputted by the divider, and outputs the selected clock signal as the system clock; and a controller that outputs the selection signal corresponding to the frequency information outputted from the processor, to the clock signal selector.

4. A microcontroller having a processor receiving as a system clock a clock signal corresponding to frequency information among a plurality of clock signals of different frequencies that are each 1/n (n is a division ratio and an integer not less than 1) an oscillation frequency, operating in synchronism with the system clock, performing fetching and decoding of an operation code and an operand stored in a memory by pipeline processing, on an instruction program comprising the operation code and the operand, and executing the instruction program based on a result of the decoding, wherein the operation code to which a frequency control signal for determining the division ratio of the system clock is added is stored in the memory, and wherein the processor outputs the frequency information corresponding to the frequency control signal by fetching and decoding the frequency control signal together with the operation code by pipeline processing, wherein a frequency control signal generator is provided for generating the frequency control signal in accordance with a division ratio setting description determining the division ratio of the system clock described in a source program, adding the frequency control signal to the operation code generated from an instruction succeeding the division ratio setting description, and converting it into a ROM code.

5. A microcontroller having a processor receiving as a system clock a clock signal corresponding to frequency information among a plurality of clock signals of different frequencies that are each 1/n (n is a division ratio and an integer not less than 1) an oscillation frequency, operating in synchronism with the system clock, performing fetching and decoding of an operation code and an operand stored in a memory by pipeline processing, on an instruction program comprising the operation code and the operand, and executing the instruction program based on a result of the decoding, wherein the operation code to which a frequency control signal for determining the division ratio of the system clock is added is stored in the memory, and wherein the processor outputs the frequency information corresponding to the frequency control signal by fetching and decoding the frequency control signal together with the operation code by pipeline processing, wherein a frequency control signal generator is provided for generating the frequency control signal in accordance with a division ratio setting description determining the division ratio of the system clock described in a source program, adding the frequency control signal to the operation code generated from an instruction preceding the division ratio setting description when the number of execution cycles of the instruction preceding the division ratio setting description is less than a reference, adding the frequency control signal to the operation code generated from an instruction succeeding the division ratio setting description when the number of execution cycles is not less than the reference, and converting it into a ROM code.

* * * * *